(12) United States Patent
Baumann et al.

(10) Patent No.: US 6,832,673 B2
(45) Date of Patent: Dec. 21, 2004

(54) HYDRODYNAMIC COUPLING DEVICE, ESPECIALLY A HYDRODYNAMIC TORQUE CONVERTER

(75) Inventors: Roland Baumann, Dittelbrunn (DE); Christoph Sasse, Schweinfurt (DE); Thomas Bauer, Grossbardorf (DE); Steffen Engel, Schönebeck (DE); Christoph Juretzka, Würzburg (DE)

(73) Assignee: ZF Sachs AG, Schweinfurt (DE)

( * ) Notice: Subject to any disclaimer, the term of this patent is extended or adjusted under 35 U.S.C. 154(b) by 0 days.

(21) Appl. No.: 10/629,995

(22) Filed: Jul. 30, 2003

(65) Prior Publication Data

US 2004/0035663 A1 Feb. 26, 2004

(30) Foreign Application Priority Data

Aug. 21, 2002 (DE) .......................... 102 38 122

(51) Int. Cl.[7] .............................................. F16H 45/02
(52) U.S. Cl. ................... 192/3.29; 192/701.12; 192/113.36
(58) Field of Search ................. 192/3.29, 3.3, 192/70.12, 113.3, 113.34, 113.36

(56) References Cited

U.S. PATENT DOCUMENTS

| | | | |
|---|---|---|---|
| 6,047,806 A | * | 4/2000 | Sasse .................... 192/113.36 |
| 6,213,273 B1 | * | 4/2001 | Menard et al. ........ 192/107 M |
| 6,290,046 B2 | * | 9/2001 | Menard et al. ........ 192/107 M |
| 6,742,638 B2 | * | 6/2004 | Maienschein et al. ..... 192/3.29 |

FOREIGN PATENT DOCUMENTS

JP          6-42606    *  2/1994

* cited by examiner

Primary Examiner—Saul Rodriguez
(74) Attorney, Agent, or Firm—Cohen, Pontani, Lieberman & Pavane

(57) ABSTRACT

A hydrodynamic coupling device, especially a hydrodynamic torque converter, includes a housing which is rotatable about an axis of rotation, a turbine wheel mounted for rotation with respect to said housing, and a bridging clutch for transmitting torque between the housing and the turbine. The bridging clutch includes a first friction element which is essentially fixed against rotation with respect to the housing, and at least one second friction element which is essentially fixed against rotation with respect to the turbine, the friction elements having respective friction surfaces which can be brought into contact with each other. A first channel, provided in one of the friction surfaces, has first channel sections with radially closed inner ends and second channel sections with radially closed outer ends. A circumferentially extending second channel, provided in the other friction surface, establishes a fluid conducting connection between the first channel sections and the second channel sections when the first friction surface contacts the second friction surface. For every part of the friction surface which is opposite the second channel in a first relative rotational position, a second relative rotational position is provided in which this same part is in contact with the friction surface having the second channel.

11 Claims, 3 Drawing Sheets

HYDRODYNAMIC COUPLING DEVICE, ESPECIALLY A HYDRODYNAMIC TORQUE CONVERTER

BACKGROUND OF THE INVENTION

1. Field of the Invention

The present invention pertains to a hydrodynamic coupling device, especially a hydrodynamic torque converter, including a housing arrangement, a turbine wheel, which rotates around an axis of rotation in the housing arrangement, and a bridging clutch arrangement for the optional production of a torque-transmitting connection between the housing arrangement and the turbine wheel. The bridging clutch arrangement includes at least one first friction element, which can rotate together with the housing arrangement and which has at least a first friction surface, and at least one second friction element, which can rotate together with the turbine wheel and which has a second friction surface, which can be brought into frictional contact with a first friction surface of the first friction element. A first surface channel arrangement with first channel sections not open at the radially inner ends and second channel sections not open at the radially outer ends is provided in the friction surface of one of the friction elements. A second surface channel arrangement extending in the circumferential direction is provided in the friction surface of the other friction element, by means of which second channel arrangement the first channel sections and the second channel sections are brought into fluid-conducting connection with each other when frictional contact is established between the first friction element and the second friction element.

2. Description of the Related Art

A hydrodynamic coupling device in the form of a hydrodynamic torque converter is known from U.S. Pat. No. 6,047,806, as shown in FIGS. 1 and 2 herein. This hydrodynamic torque converter 10 comprises a housing arrangement 12 with a housing cover 14 and a pump shell 18, which forms an essential component of a pump wheel 16. On its inner surface, this pump shell 18 carries a plurality of pump vanes 20, arranged in a row in the circumferential direction around an axis of rotation A. In the interior space 22 of the housing arrangement 12, furthermore, a turbine wheel 24 is provided. Radially on the outside, the turbine wheel 24 has a turbine shell 26 with a plurality of turbine vanes 28 supported thereon. Radially on the inside, the turbine wheel 24 can be connected nonrotatably to a power takeoff element 32, such as a transmission input shaft, by way of a turbine hub 30.

A bridging clutch arrangement 34 is provided to establish a direct torque-transmitting connection between the housing arrangement 12 and the turbine wheel 24. In the example shown here, this coupling arrangement comprises a piston 36, serving as a friction element, which is connected nonrotatably to the turbine wheel 24, namely, to the turbine wheel shell 26. On the side facing the housing cover 14, the piston 36 carries a ring-like friction lining 38. This lining can be made of suitable material such as fiber-reinforced polymer material to achieve the desired frictional relationships. In this case, the housing cover 14 serves as the opposing friction element; that is, the part of its surface which is axially across from the friction lining 38 serves as the opposing friction element. By increasing the fluid pressure in a space 40, which is formed essentially between the piston 36 and the pump wheel shell 18, and which also contains the turbine wheel 24, with respect to a space 42, which is formed essentially between the housing cover 14 and the piston 36, the piston 36, the radially inner part of which is able to slide along the turbine wheel hub 30 but is guided in a fluid-tight manner, is pressed toward the housing cover 14 so that the friction lining 38 arrives in frictional contact with the housing cover 14. FIG. 2 shows an axial view of the friction lining 38, namely, a view of the side which is across from the housing cover 14 and which thus provides the friction surface 44. A surface channel arrangement 46 includes a plurality of more-or-less radially oriented first channel sections 48, arranged in sequence around the circumference, which are open at the radially outer ends and closed at the radially inner ends. In addition, a plurality of second channel sections 50 is provided, which are offset from the first channel sections 48. These second channel sections 50 are closed at the radially outer ends and open at the radially inner ends. The first channel sections 48 and the second channel sections 50 are not connected directly to each other. A ring-shaped groove 54, however, is provided as a second surface channel arrangement on the frictionally effective surface 52 of the housing cover 14; this groove is formed as a circular ring passing around the axis of rotation A. The first channel sections 48 and the second channel sections 50 extend far enough from their radially outer and radially inner ends that they at least partially overlap the ring-shaped groove 54. When frictional contact is established between the friction lining 38 and housing cover 14, therefore, fluid from the first space 40 can enter the first channel sections 48 radially from the outside. From these first channel sections 48, the fluid then passes into the ring-shaped groove 54, from which the fluid then can emerge via the second channel sections 50 radially on the inside and thus arrive in the second space 42. It is therefore ensured that, even when the bridging clutch arrangement 34 is active, fluid can be exchanged between the two spaces 40, 42 and thus an exchange of fluid can take place in the entire interior space 22 to prevent the fluid from overheating. This is especially important in the case of converters of the two-line type. The first surface channel arrangement 46 with its channel sections 40 and 50 and the second surface channel arrangement with its ring-shaped channel 54 also ensure that the fluid flowing from the first space 40 to the second space 42 remains for a comparatively long time in the area of the frictionally active surfaces, so that an additional amount of heat can be carried away from this area, which is subject to very severe thermal loads.

So that defined fluid flow relationships between the first space 40 and the second space 42 can be provided in an arrangement of this type, the flow cross sections of the two surface channel arrangements 46, 54 are provided with defined ratios. It has been found, however, that especially the circular ring-like groove 54 suffers from the problem of that its open flow cross section decreases over the course of its service life.

The essential reason for this is that the friction surface 44, which makes contact with the housing cover 14, is on a friction lining 38, which is subject to a certain amount of abrasion. This abrasion, however, will not occur where the friction lining 38, i.e., the area of the friction surface 44 thereof, is opposite the groove 54, because there is no frictional contact here. Therefore, over the course of time, an excess thickness will develop, which projects more and more deeply into the groove 54, thus reducing its flow cross section.

SUMMARY OF THE INVENTION

The task of the present invention is to provide a hydrodynamic coupling device of the type described above in which measures are taken to reduce the change in the fluid flow relationships which occur as a result of wear.

According to the invention, essentially for each part of the friction surface of the one friction element which is across from the second surface channel arrangement when in a first relative rotational position of the first friction element with respect to the second friction element, a second relative rotational position is provided, in which this same part of the friction surface is in contact with the friction surface of the other friction element, instead of being across from the channel, where there is no friction.

In the present invention, measures are taken to ensure that there are essentially no friction surface areas present which are not subjected to friction over the course of their service life. Thus it is ensured that, especially when the clutch is slipping, that is, when the two friction elements with the friction surfaces which are interacting frictionally with each other are rotating at different speeds, essentially all parts of the friction surfaces become frictionally active once during each complete relative rotation of these two elements with respect to each other, and thus abrasion occurs uniformly over all of the surfaces.

This change between a state in which a certain friction surface area is across from the second surface channel arrangement and a state in which this same friction surface area is in contact with the other friction surface can be achieved by allowing the radial distance between the second surface channel arrangement and the axis of rotation to change in the circumferential direction. In the case of an embodiment which is especially preferred for manufacturing reasons, it is possible for this purpose to design the second surface channel arrangement in the form of a circle with a center which is eccentric with respect to the axis of rotation. To ensure that the critical friction surface areas on the one friction element can become frictionally active in the case of the channel arrangement which changes once between a maximum and a minimum as it passes around the entire circumference as a result of the introduction of an eccentricity, it is also proposed that the eccentricity of the center of the circle with respect to the axis of rotation be equal to at least approximately half the radial width of the second surface channel arrangement in the friction surface of the other friction element.

The components which are used in hydrodynamic coupling devices and which are frictionally active have a certain play in the radial direction as a result of their connection to, for example, the housing arrangement for rotation in common, this connection often being produced by sets of teeth. This play is superimposed on the change in the radial position of the second surface channel arrangement, so that, even if the eccentricity in the case of, for example, a second surface channel arrangement with an eccentric design is somewhat smaller than half the radial width of this second arrangement, the statistical movement in the radial direction which occurs as a result of tolerances which allow movement will be superimposed on this eccentricity. Even in this case, therefore, by inclusion of this statistical movement in the radial direction, it will be ensured that all parts of the opposite surface will come into contact once per revolution with the friction surface in which the second surface channel arrangement is provided. It should also be pointed out that, according to the principles of the present invention, literally all parts of the surface do not have to come into contact with the friction surface of the other friction element in which the second surface channel arrangement is provided. Depending on the width or flow cross section of the second surface channel arrangement, it is possible for a thin web, for example, to remain intact, part of which can break off by itself perhaps or which is so thin that the flow cross section of the second surface channel arrangement will not be significantly reduced.

In an especially preferred embodiment especially for avoiding imbalances, it can be provided that the second surface channel arrangement is designed in the form of an ellipse. In addition, the change between a frictionally active and a frictionally inactive state of certain parts of the surface can be achieved by designing the second surface channel arrangement with waves extending around in the circumferential direction. It should be noted here that an undulating or wave-like shape can obviously be superimposed on a circular form or an elliptical form or any other form which is rotationally symmetric or is not rotationally symmetric to the axis of rotation.

The other of the friction elements can have a metal friction surface, and the one of the friction elements can have a friction surface formed on a friction lining to provide defined frictional relationships.

So that high torques can be transmitted between the housing arrangement and the turbine wheel, it is also possible for the other of the friction elements to have a friction surface on both axial sides, each of these being provided with a second surface channel arrangement. In this type of embodiment, therefore, there are several different surface pairings which can be brought into interaction with each other, so that the corresponding overall frictional surface area is increased. So that it is possible to avoid the occurrence of imbalances in an arrangement of this type, that is, in an arrangement in which the second friction element is frictionally active on both sides and has a surface channel arrangement on both sides, it is proposed that the surface channel arrangements provided on both axial sides be essentially the same, but angularly offset with respect to each other in the circumferential direction.

According to another embodiment, it is possible for the second surface channel arrangement to be interrupted in at least one circumferential area. Regardless of whether this circumferential interruption has a uniform or a changing radial distance from the axis of rotation, providing the second surface channel arrangement with at least one circumferential interruption represents another method of ensuring that the parts of the opposing friction surface which would otherwise always be opposite the surface channel arrangement are contacted and thus subjected to abrasion, namely, by this interruption of the second channel arrangement.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
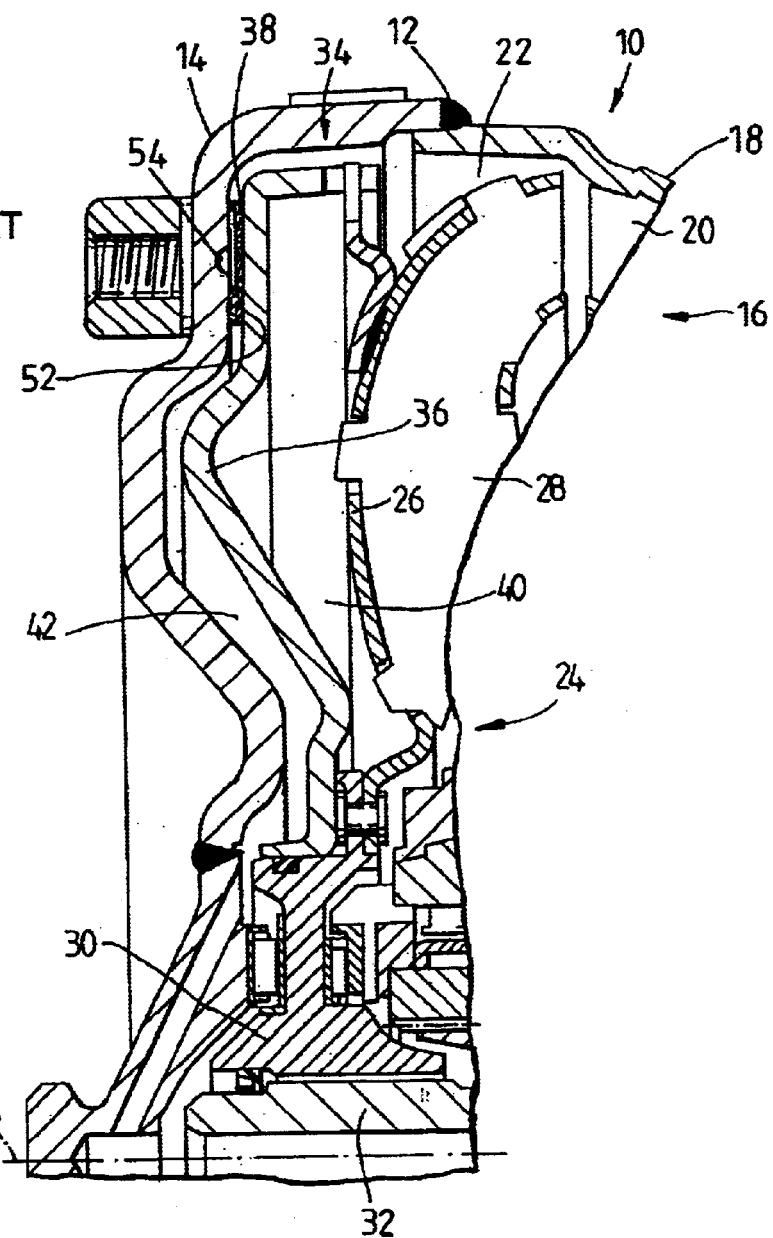
FIG. 1 shows a partial longitudinal cross section through a hydrodynamic torque converter.
Figure 2:
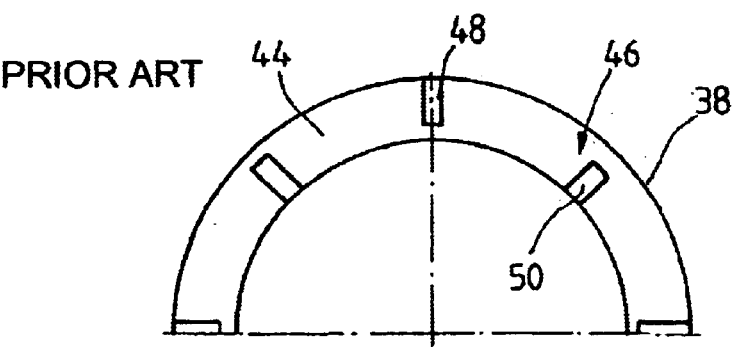
FIG. 2 shows an axial view of a friction lining used in the torque converter according to FIG. 1.

The basic design of a hydrodynamic coupling device, such as a hydrodynamic torque converter, has already been described above with reference to FIGS. 1 and 2. This basic design, the details of which obviously can be modified in a wide variety of ways, will therefore not be discussed any further in the following. Only the components or system areas in a hydrodynamic torque converter of this type which are of importance with respect to the present invention, will be discussed.

Figure 3:
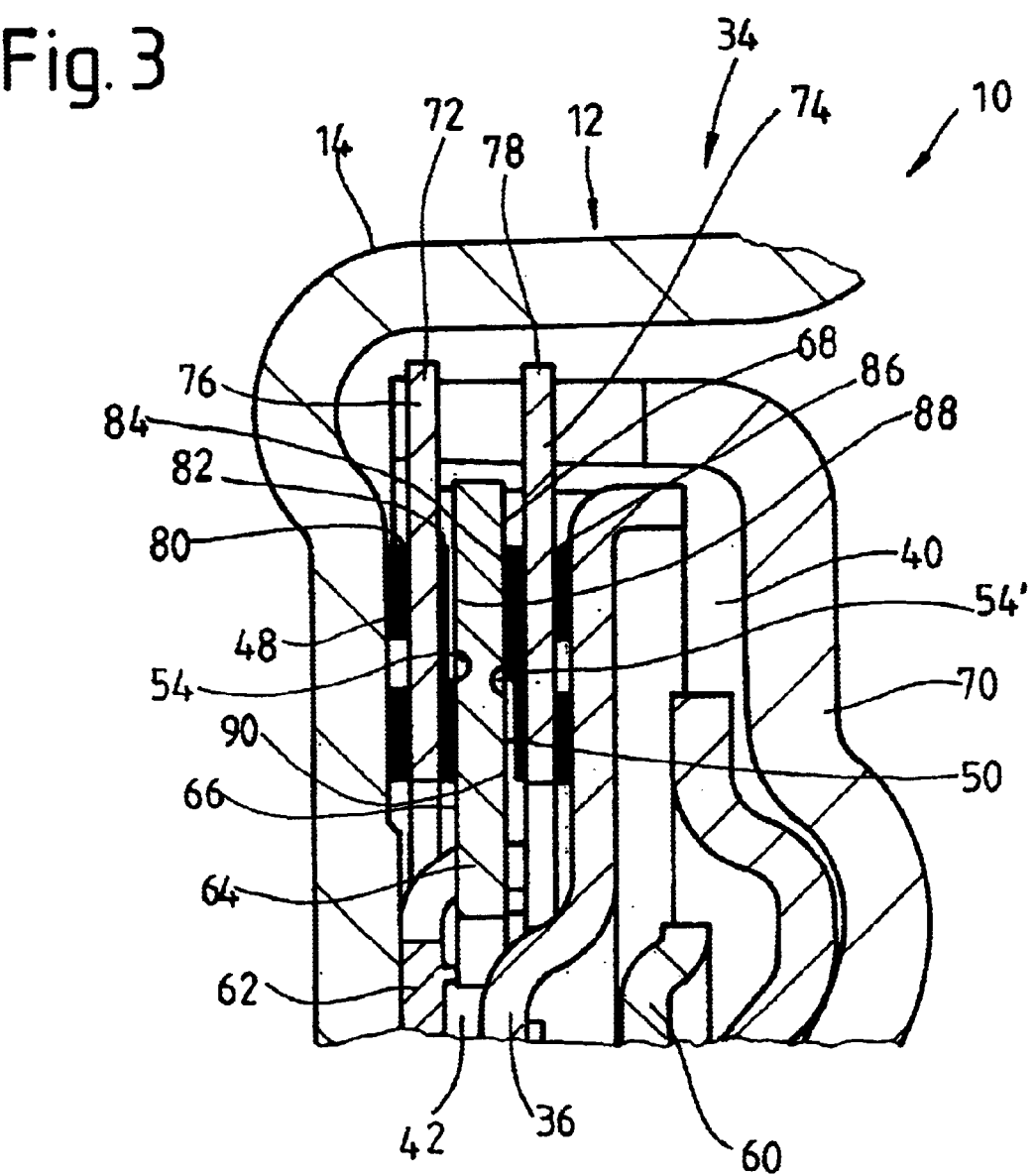
FIG. 3 shows a detailed view of a bridging clutch arrangement and the components which it connects.

FIG. 3 shows a hydrodynamic torque converter 10 according to the invention in the form of an enlarged view of the bridging clutch arrangement 34 of this converter. In the model shown here, the piston 36 is connected by a connecting element 60 with freedom of axial movement but nonrotatably to the housing arrangement 12. In addition, a friction disk 64 made of metal is connected nonrotatably to the housing arrangement 12 by a driver element 62; this disk retains a certain freedom of axial movement, however, with respect to the housing arrangement 12, i.e., to the housing cover 14 of that arrangement. The friction disk 64 has friction surfaces 66, 68 on its two axial sides. An additional driver element 70, which is permanently connected to the turbine 24 wheel (see FIG. 1), connects two friction disks 72, 74 to the turbine wheel for rotation in common. Each of these two friction disks 72, 74 can have a carrier element 76, 78 made of metal, which carries friction linings 80, 82; 84, 86 on its two axial sides. In the bridging state, that is, in a state in which the piston 36, which is nonrotatably connected to the housing arrangement 12, is pressed toward the housing cover 14 by the appropriate adjustment of the pressure relationships in the spaces 40, 42, the radially outer area of the piston 36 exerts force on the friction lining 86 of the friction disk 74, the second friction lining 84 or friction surface 90 of which is in frictional contact in turn with the friction surface 68 of the friction disk 64. The friction surface 66 of this disk presses against a friction surface 88 of friction lining 82 on the friction disk 72, the other friction lining 80 of which presses in turn against the housing cover 14.

In the design example of FIG. 3, it can be seen that surface channel arrangements 54, 54' are again provided in the two friction surfaces 66, 68 of the central friction disk 64. The channel sections 48, 50 of the surface channel arrangement 46 visible in the friction lining of FIG. 2 are again provided in the friction surfaces 88, 90 of the friction linings 82, 84 entering into frictional contact with the two friction surfaces 66, 68 of the friction disk 64. Thus again, in the cooperation between the two friction disks 72, 74 with the central friction disk 64 located between them, a fluid exchange between the two spaces 40, 42 is ensured. On the two axial sides, the surface channel arrangements 54, 54' in question have the function of transferring fluid between the channel sections 48, 50 of the surface channel arrangements 46 in the friction linings 82, 84.

Figure 4:
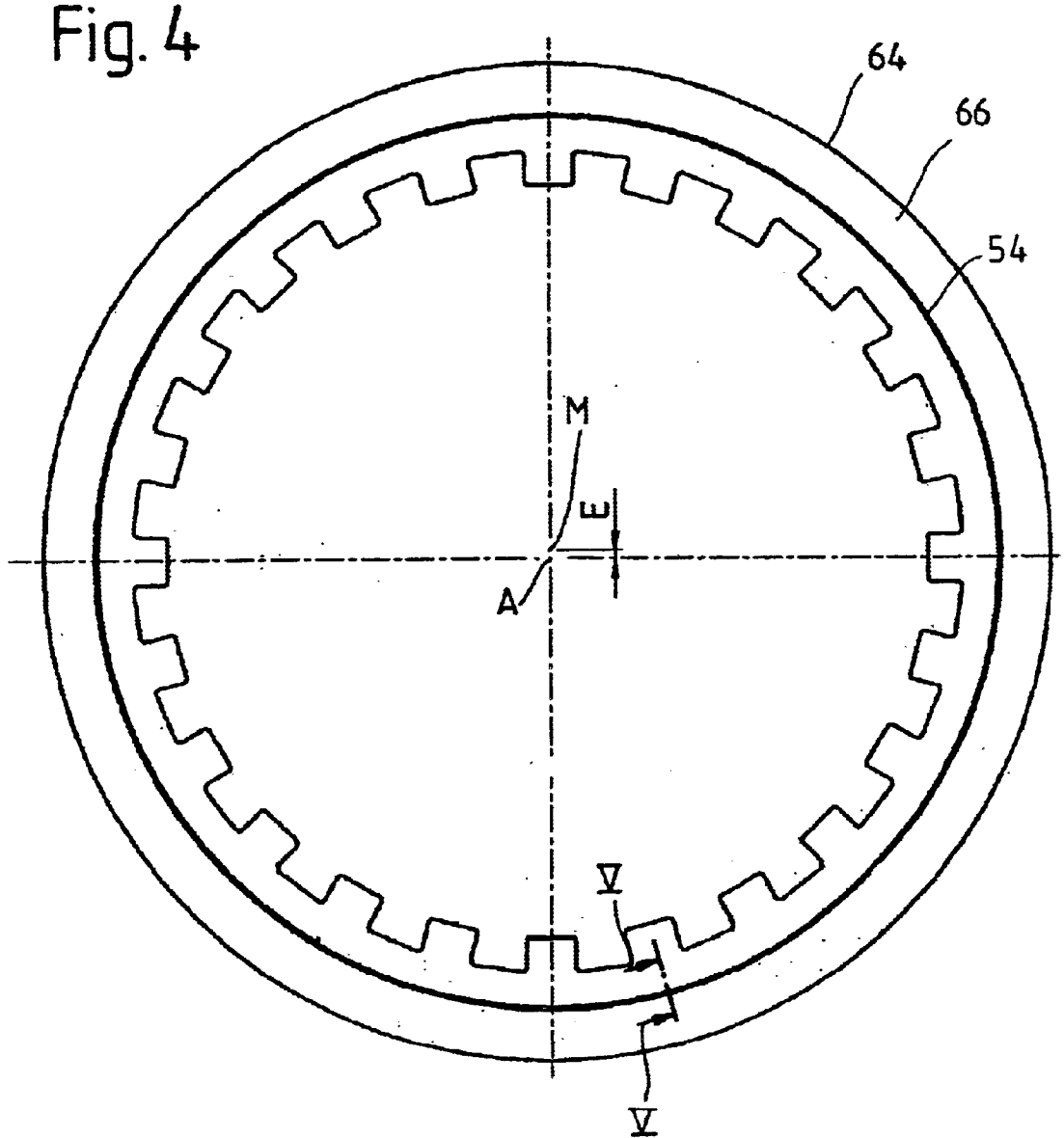
FIG. 4 shows an axial view of a friction disk used in the bridging clutch arrangement of FIG. 3.
Figure 5:
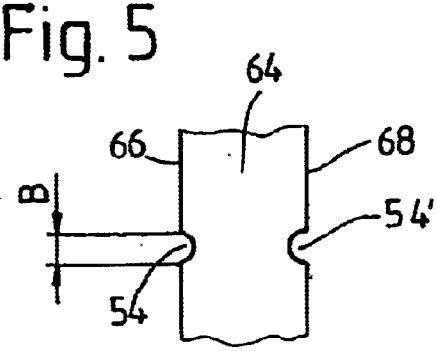
FIG. 5 shows a cross-sectional view of the friction disk shown in FIG. 4, cut along line IV—IV of FIG. 4.

FIG. 4 shows an axial view of the friction disk 64. It can be seen in FIG. 4 that the surface channel arrangement 54 is designed in the form of a ring-like groove, which is more-or-less in the middle of the friction surface 66. This groove also has a circular shape in the example presented here, but it has a center point M with an eccentricity E with respect to the axis of rotation A of the overall system. This eccentricity E is calculated so that, for every relative circumferential movement between, for example, the friction surface 66 of the friction disk 64 and the friction surface 88 of the friction lining 82, it is ensured that, because of the eccentricity of this ring-like groove 54, every part of the surface of the friction surface 88 which is opposite the ring-like groove 54 in a certain relative rotational position is no longer opposite it in another relative rotational position and is instead in contact with part of the friction surface 66. Thus, over the course of a complete relative rotation between the two frictionally interacting surfaces, the entire friction surface 88 will be frictionally contacted. As a result, the danger that certain parts of the surface of the friction lining 82 will not be subjected to friction and that therefore an excess thickness will form is eliminated. The same is also true, of course, for the friction lining 84 provided on the other side of the friction disk.

To ensure by the introduction of an eccentricity that every part of the surface of the friction surfaces 88, 90 makes contact once with the friction disk 64, the eccentricity E can be calculated so that it is at least in the range of half the radial width B of the ring-like groove 54 or 54' in question. Of course, this eccentricity can also be larger.

The principle of the present invention can obviously be applied also to bridging clutch arrangements designed in other ways. For example, the ring-like groove 54 shown in FIG. 1 could also be designed with a corresponding eccentricity to the axis of rotation A, so that, when slipping occurs in the case of the friction lining 38 present on the piston 36, it is ensured that the friction surface 44 of this lining is completely contacted. In the embodiment according to FIG. 3, the grooves or recesses of the type described above which create the surface channel arrangements could also be present, of course, both in the piston 36 of the bridging clutch arrangement 34 and in the housing cover 14 if corresponding channel sections 48, 50, for example, are present in the friction linings 80, 86 of the surface channel arrangement 46. The design according to the invention is always especially advantageous when a surface channel arrangement on a component subject to a lesser amount of wear, such as a metal friction surface, cooperates with an associated surface channel arrangement on a friction component subject to a greater amount of wear.

Especially when a surface channel arrangement to be positioned according to the invention is provided on both axial sides of a friction component, such as the friction disk 64 shown in FIG. 3, it is advantageous for these surface channel arrangements 54, 54' to be positioned in such a way that the overall imbalances are equalized. That is, in the case of surface channel arrangements 54, 54' designed with an eccentric circular form, these can be rotated 180° with respect to each other.

It is also obvious that the surface channel arrangements 54, 54' can also be given a different shape. An elliptical shape, for example, is also possible, so that, through the change between areas of shorter radial distance and areas of longer radial distance, the entire friction surface on an opposing friction lining is contacted. It is also conceivable that the arrangements 54, 54' could have a wave-like shape; this wave-like shape could also obviously be superimposed on a circular, elliptical, or some other shape. A wave-like structure of this kind could obviously also be made up of square waves, triangular waves, or the like. In general, therefore, any shape departing from a precise circle is possible here.

In another embodiment of the present invention, the surface channel arrangement 54 or the arrangements 54, 54' can be designed with a non-eccentric circular form, but be provided with at least one interruption in the circumferential direction. The area where this circumferential interruption is located represents a normally active friction surface area, which passes over the opposing friction surface of a friction lining and thus ensures that the surface areas which, in other relative rotational positions, are opposite the surface channel arrangement 54, 54' in question, are subjected to the action of this interrupted area, with the result that abrasion occurs here also. For reasons of symmetry, it can be advantageous to provide an interruption of this type at several points around the circumference. It is also obvious that these types of circumferentially interrupted surface channel arrangements can also be combined with a shape departing from an exact circle without eccentricity.

In another embodiment of the present invention, it is also possible for a friction element such as, for example, the friction disks 72, 74 on the carrier element 76, 78, to have a friction lining on only one axial side, whereas the metal surface of the carrier element is frictionally active on the other side. The friction lining on the one axial side can in this case be constructed as described above, that is, for example, with the channel sections 48, 50, whereas the metal surface of the carrier element 76, 78 is designed with the surface channel arrangement 54, 54' for cooperation with the friction lining of another friction disk situated axially across from it.

It should also be pointed out that the present invention can obviously also be applied to a hydrodynamic coupling, that is, to a system in which a hydrodynamic circuit created between the pump and the turbine does not have a stator to absorb the torque, but where nevertheless a bridging clutch arrangement is provided in order produce a direct torque-transmitting connection between the turbine and the housing arrangement in a phase in which no slipping is supposed to occur.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A hydrodynamic coupling device comprising a housing which is rotatable about an axis of rotation, a turbine wheel mounted for rotation with respect to said housing, and a bridging clutch for transmitting torque between the housing and the turbine, said bridging clutch comprising:
   a first friction element which is essentially fixed against rotation with respect to said housing, said first friction element having an axially facing first friction surface;
   at least one second friction element which is essentially fixed against rotation with respect to said turbine, said second friction element having an axially facing second friction surface which can contact said first friction surface;
   a first channel in one of said friction surfaces, said first channel having first channel sections with radially closed inner ends and second channel sections with radially closed outer ends; and
   a circumferentially extending second channel in the other of said friction surfaces, said second channel being arranged so that, in a first relative rotational position of said friction elements, parts of the other of said friction surfaces are opposite said second channel, and so that, in a second relative rotational position of said friction elements, said parts are in contact with said one of said friction surfaces, said second channel establishing a fluid conducting connection between said first channel sections and said second channel sections when said first friction surface contacts said second friction surface.

2. A hydrodynamic coupling device as in claim 1 wherein said second channel is arranged at a radial distance from said axis of rotation, said distance changing in a circumferential direction.

3. A hydrodynamic coupling device as in claim 1 wherein said second channel is shaped as a circle having a center which is eccentric to said axis of rotation.

4. A hydrodynamic coupling device as in claim 3 wherein said second channel has a radial width, said center of said circle being offset from said axis of rotation by an eccentricity which is at least half said radial width.

5. A hydrodynamic coupling device as in claim 1 wherein said second channel is shaped as an ellipse.

6. A hydrodynamic coupling device as in claim 1 wherein said channel is profiled with circumferentially extending waves.

7. A hydrodynamic coupling device as in claim 1 wherein the other of said friction surfaces is metal.

8. A hydrodynamic coupling device as in claim 7 wherein the one of said friction surfaces is formed by a friction lining.

9. A hydrodynamic clutch device as in claim 1 wherein the other of said friction elements has axially facing mutually opposed friction surfaces and a circumferentially extending second channel in each of said mutually opposed friction surfaces.

10. A hydrodynamic coupling device as in claim 9 wherein said second channels have essentially similar shapes but are angularly offset from each other.

11. A hydrodynamic coupling device as in claim 1 wherein said second surface channel has at least one circumferential interruption.

* * * * *